Patented Apr. 9, 1946

2,398,254

UNITED STATES PATENT OFFICE 2,398,254

ABSORPTION BASES

Nina K. Rosenthal, Chicago, Ill., assignor, by mesne assignments, to Ninol Development Co., Chicago, Ill., a copartnership consisting of Marcia Kritchevsky, Diana Kritchevsky, Theodore Kritchevsky, Gene Kritchevsky, Nina K. Rosenthal, Gertz Krit, and Carleton M. Tower No Drawing. Application August 29, 1941,
Serial No. 408,811

7 Claims. (Cl. 167—63)

My invention relates to the preparation of ointments, creams, salves and the like and is particularly concerned with novel and highly useful so-called absorption bases and ingredients thereof.

An absorption base for use in the preparation of ointments, creams, salves and the like must possess several properties or characteristics if it is to be fully satisfactory. Thus, for example and among other things, it must have the ability to absorb substantial quantities of water and to retain such water, without separation, over substantial periods of time. It must, in addition, be non-toxic and non-irritating to human skin or tissue. Again, it must be free of the tendency to cause dermatitis and other allergy symptoms. Still further, it must be soluble in the mineral oil or other oleaginous materials utilized in the ointments and the like, and must be compatible with and unaffected by or have any adverse effect upon the usual drugs and medicaments which are conventionally incorporated into the ointments and the like.

Various materials have heretofore been suggested and used as absorption bases including lanolin and oxycholesterin materials and synthetic compositions sold under various trade names such as "Aquaphor" and the like. These and other materials have, however, for various reasons, such as poor absorptive characteristics, high cost, unavailability, and the like, left much to be desired in the way of obtaining a fully satisfactory absorptive base.

I have evolved new and highly satisfactory materials for the preparation of absorptive bases which are non-toxic, highly absorptive and retentive of moisture, and which are inexpensive and readily produced in a very simple manner.

In general, my novel absorption bases comprise solutions, in an oleaginous material, of several percent of condensation products of oleic acid with monoethanolamine or diethanolamine, which ethanolamines, for convenience of expression, I denote as hydroxy-ethyl non-tertiary amines, the molal ratio of the monoethanolamine or diethanolamine to the oleic acid falling within certain limits as hereinafter set forth. The aforesaid condensation products are dissolved preferably in a mineral oleaginous material, particularly petrolatum, although mineral oils modified or not with the addition of paraffin waxes or beeswax or other oleaginous or waxy materials, mineral greases, mineral waxes, wool fat, vegetable and animal oils and fats, hydrogenated or not, may also be utilized. The percentage of condensation product in the petrolatum or the like may vary within wide limits, about 1% to about 10% encompassing the average situation with about 5% representing a preferred embodiment. The drugs or medicaments or the like and the water are incorporated into the absorption base in the usual manner.

The following examples are illustrative of the practice of my invention. It will be understood that various changes may be made without departing from the spirit of the invention, all within the scope of the disclosure in the light of the guiding principles set forth.

Example I

One mol of monoethanolamine and two mols of oleic acid were condensed at 150 degrees C. to 160 degrees C. for two hours. The resulting condensation product, after cooling to about room temperature, was admixed with petrolatum to provide a 5% solution. The resulting absorption base had excellent properties, absorbing several times its weight of water and retaining the same without separating over long periods of time.

Example II

One mol of diethanolamine and two mols of oleic acid were condensed at 150 degrees C. to 160 degrees C. for two hours. The resulting condensation product, after cooling to room temperature, was admixed with petrolatum to provide a 5% solution. The product had excellent properties as an absorption base for ointments, salves, creams and the like.

Example III

One mol of monoethanolamine and three mols of oleic acid were condensed at about 160 degrees C. for about two to two and one-half hours. The resulting condensation product was dissolved in mineral oil to form a 6% solution. It had good properties as an absorption base.

Example IV

Three mols of diethanolamine and five mols of oleic acid were condensed at about 155 degrees C. to 160 degrees C. for about two hours and the resulting condensation product, on cooling to room temperature, was dissolved in petrolatum to form a 6% solution. It formed an excellent absorption base.

Instead of using oleic acid in the preparation of condensation products, I may use an oleic acid acylating compound such as esters, anhydrides and acyl halides of oleic acid. Such esters include, for example, mono-olein, di-olein, tri-olein and triglyceride oils high in tri-olein, such as, for example, cottonseed oil; methyl and ethyl esters of oleic acid and the like. Oleic chloride is an example of the acyl halides of oleic acid which may be utilized in the condensation reaction with monoethanolamine or diethanolamine. The term "oleic acid acylating compound," as used in the claims, is intended to cover such compounds as free oleic acid and acyl halides, esters and anhydrides thereof and other compounds which react with monoethanolamine or diethanolamine to introduce an oleic acid acyl radical thereinto.

In producing the condensation products, the condensation may take place at temperatures as low as about 100 degrees C. but, for appreciable speed of reaction, the temperature should be somewhat above 100 degrees C. A good operating range is about 135 degrees C. to 175 degrees C., particularly good results being obtained by the use of a temperature range from about 150 degrees C. to 160 degrees C. Where the acyl halides of oleic acid are used in the condensation reaction in place of the free oleic acid, lower temperatures can be employed. The time of reaction in carrying out the condensation is also variable, in the usual case a few hours being adequate, from about one and one-half hours to about two and one-half hours being generally quite satisfactory.

I have found that those condensation products wherein the molal ratio of monoethanolamine or diethanolamine to oleic acid is 1 to 2 or about 1 to 2 are especially satisfactory. I may, however, utilize, with fairly good results, the condensation products where the molal ratio of the oleic acid to the monoethanolamine or diethanolamine is of the order of 1.5 to 1 or of the order of 1.8 to 1, or as high as 3 to 1 as shown by Example III.

It will be understood that I may use either pure or commercial sources of monoethanolamine or diethanolamine and oleic acid, or products which contain high or predominating proportions of the said substances.

The term "condensation product" is employed in its conventionally understood manner to cover reaction products between the monoethanolamine or diethanolamine and oleic acid acylating compound wherein water or acid or some other material is split out as a result of the union of the molecules of monoethanolamine or diethanolamine and oleic acid acylating compound. Similarly, the term "condensation" is used to cover a reaction wherein water or acid or other material is split out as a result of the union of the molecules of monoethanolamine or diethanolamine and oleic acid acylating compound.

What I claim as new and desire to protect by Letters Patent of the United States is:

1. An absorption base consisting essentially of an oleaginous material and a minor percentage of a condensation product of an hydroxy-ethyl non-tertiary amine and oleic acid, the molal ratio of the oleic acid to the hydroxy-ethyl non-tertiary amine being from approximately 1.5 to approximately 3 mols of oleic acid for each mold of said amine.

2. An absorption base consisting essentially of petrolatum and a minor percentage of a condensation product of diethanolamine and oleic acid, the molal ratio of the diethanolamine to the oleic acid being about 1 to 2.

3. An absorption base consisting essentially of a mineral oleaginous material and a minor percentage of a condensation product of monoethanolamine and oleic acid, the molal ratio of the monoethanolamine to the oleic acid being about 1 to 2.

4. An absorption base consisting essentially of an oleaginous material and a condensation product of an hydroxy-ethyl non-tertiary amine and an oleic acid acylating compound, the molal ratio of the oleic acid present in said acylating compound to the hydroxy-ethyl non-tertiary amine being from approximately 1.5 to approximately 3 mols of oleic acid for each mol of said amine.

5. An absorption base consisting essentially of an oleaginous material and a condensation product of an hydroxy-ethyl non-tertiary amine and an oleic acid acylating compound, the molal ratio of the oleic acid present in said acylating compound to the hydroxy-ethyl non-tertiary amine being about 2 to 1.

6. An absorption base consisting essentially of petrolatum and a minor percentage of a condensation product of diethanolamine and an oleic acid acylating compound, the molal ratio of the diethanolamine to the oleic acid present in said acylating compound being about 1 to 2.

7. An absorption base consisting essentially of an oleaginous material and a minor percentage of a condensation product of monoethanolamine and an oleic acid acylating compound, the molal ratio of the monoethanolamine to the oleic acid present in said acylating compound being about 1 to 2.

NINA K. ROSENTHAL.